(12) United States Patent
Schneider

(10) Patent No.: US 6,687,753 B2
(45) Date of Patent: *Feb. 3, 2004

(54) METHOD AND SYSTEM FOR PROVIDING THREE-DIMENSIONAL GRAPHICS OVER COMPUTER NETWORKS

(75) Inventor: Bengt-Olaf Schneider, Yorktown Heights, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 270 days.

(21) Appl. No.: 09/104,450

(22) Filed: Jun. 25, 1998

(65) Prior Publication Data

US 2001/0037402 A1 Nov. 1, 2001

(51) Int. Cl.$^7$ .................. G06F 15/16; G06F 15/173
(52) U.S. Cl. .................. 709/235; 709/217; 709/219; 709/223; 709/224; 709/231; 709/232; 709/234; 709/235; 709/246; 345/419
(58) Field of Search .................. 709/236, 202, 709/232, 233, 234, 235, 238, 240, 241, 243, 244, 226, 246, 217, 219, 223, 224, 231; 710/1; 345/419, 418; 348/559, 211.2, 211.4

(56) References Cited

U.S. PATENT DOCUMENTS

| | | | | | |
|---|---|---|---|---|---|
| 5,548,340 | A | * | 8/1996 | Bertram | 348/559 |
| 5,838,906 | A | * | 11/1998 | Doyle et al. | 709/202 |
| 5,912,670 | A | * | 6/1999 | Lipscomb et al. | 345/419 |
| 5,968,132 | A | * | 10/1999 | Tokunaga et al. | 709/247 |
| 5,991,824 | A | * | 11/1999 | Strand et al. | 710/1 |
| 5,999,979 | A | * | 12/1999 | Vellanki et al. | 709/232 |
| 6,032,189 | A | * | 2/2000 | Jinzenji et al. | 709/235 |
| 6,043,837 | A | * | 3/2000 | Driscoll, Jr. et al. | 348/36 |
| 6,233,017 | B1 | * | 5/2001 | Chaddha | 348/412 |
| 6,337,881 | B1 | * | 1/2002 | Chaddha | 375/240.16 |
| 6,522,352 | B1 | * | 2/2003 | Strandwitz et al. | 348/211.2 |

* cited by examiner

*Primary Examiner*—Robert B. Harrell
*Assistant Examiner*—Paul H. Kang
(74) *Attorney, Agent, or Firm*—Douglas Cameron; Anne V. Dougherty

(57) ABSTRACT

Client-server graphics transmission system wherein component capabilities are provided at the server and client locations for the following: to gather three dimensional graphics transmission performance parameters, including client rendering capabilities, server load, network bandwidth and optionally-provided user preferences; to evaluate the potential performance of different transmission methods which could be used to communicate a graphics data set from the server to the client; to choose and request a transmission method based upon the evaluating; to format the requested data set for transmission; and to provide the formatted data set for rendering at the display hardware associated with the client.

26 Claims, 3 Drawing Sheets

METHOD AND SYSTEM FOR PROVIDING THREE-DIMENSIONAL GRAPHICS OVER COMPUTER NETWORKS

FIELD OF THE INVENTION

This invention relates to client server computer networks and more particularly to handling quality communication of three-dimensional graphics from a server to a client location.

BACKGROUND OF THE INVENTION

Increasingly, the data necessary to create three dimensional graphics reside on servers, from whence the information is accessed and transmitted to the client for display. For instance, design data for buildings or geological data for petroleum exploration are stored and maintained on centralized file servers. An individual user assesses the data over a network from their client computer location. Given the fact that the required graphics information can be quite extensive, and the fact that, in the past, an entire data set was required to have been transferred to the client before any information could be displayed, high demands were placed on the network, resulting in long delays between a request and the corresponding display. In addition, extensive data sets require the availability of large local storage at the client.

A challenge to the implementation of a system for downloading three dimensional graphics, whether designed for downloading in one or a series of transfers, is the compatibility of components at the client and the server. A particular mechanism for transferring data from a server to the client may be ideally suited for a certain combination of clients, servers and networks, but may perform poorly in other environments. For instance, the compression of geometric data, as described in "Geometry Compression" by M. Deering, Proceedings Siggraph, 1995, pp 13–20, can be used to reduce the amount of data to be transferred over the network between a server and the client. However, geometry compression will not provide sufficient response time if the model is complex. The system takes a long time to compress the image at the server, and a correspondingly long time to display at the client, unless the client is equipped with a special graphics accelerator. If the client does not have the accelerator for rendering images, it may be more advantageous to transmit a panoramic image, or another representation which does not require a specialized capability for rendering.

Ideally, a system could adaptively select among a number of transmission techniques in response to the capabilities of the client, the network and the server, wherein a client could specify the transmission protocol and the server could format the information to be transmitted in response to the client request.

It is therefore an objective of the invention to reduce the time between a request for three dimensional graphics data from a server and the display of requested information at the client location.

It is another objective of the invention to facilitate the communication of three dimensional graphics data to a client without requiring that client local storage be large enough to accommodate all relevant data at one time.

Yet another objective of the invention is to provide the foregoing capabilities for three dimensional graphics transmission among clients and servers having different capabilities.

SUMMARY OF THE INVENTION

These and other objectives are realized in the present invention wherein component capabilities are provided at the server and client locations to gather three dimensional graphics transmission performance parameters, including client rendering capabilities, server load, network bandwidth and optionally-provided user preferences; to evaluate the potential performance of different transmission methods which could be used to communicate a graphics data set from the server to the client; to choose and request a transmission method based upon the evaluating; to format the requested data set for transmission; and to provide the formatted data set for rendering at the display hardware associated with the client.

BRIEF DESCRIPTION OF THE DRAWINGS

The invention will now be detailed with specific reference to the appended figures wherein.

DESCRIPTION OF THE PREFERRED EMBODIMENT

System Architecture

Figure 1:
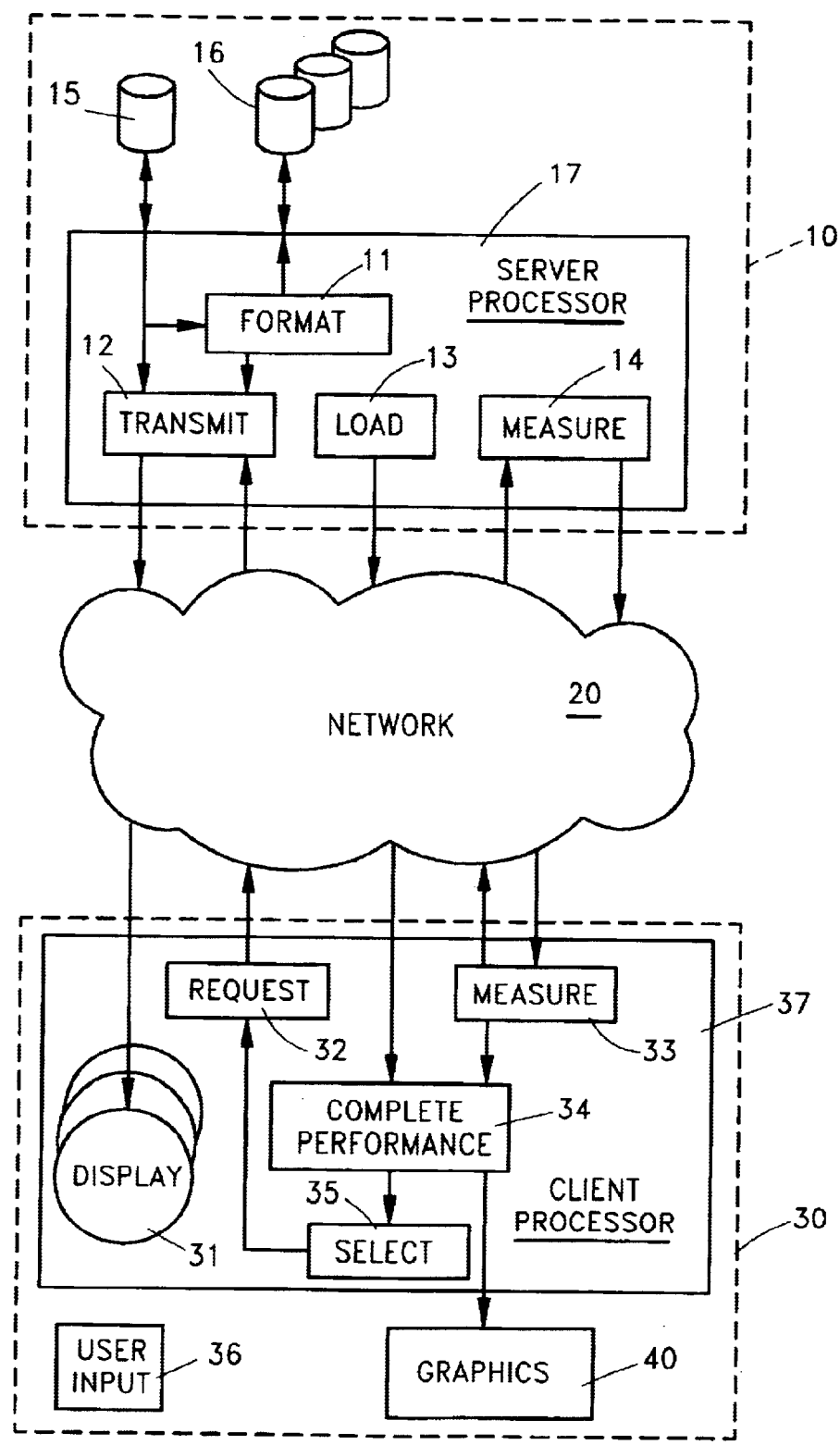
FIG. 1 provides a representative system architecture for use with the present invention.

As shown in FIG. 1, the inventive system architecture is designed to use different transmission techniques to transfer a three dimensional graphics data set between a server location 10 and a client location 30 over network 20. For simplicity of explanation, the Figure illustrates one each of the server, client, data set and network, and of the server and client peripherals. Clearly, however, the invention is contemplated to be implemented in an environment wherein a plurality of clients, having differing capabilities (each client potentially including more than one display engine), may request from a plurality of data sets located at one or more storage locations associated with one or more servers, along one or more different networks. The invention provides a ubiquitous system and methodology for supplying the requested information in the optimal manner (i.e., formatting, transmission technique, etc.) to be received at and used by the client.

The server location 10, with at least one server processor 17, stores the data set in its original representation at storage location 15. The server also has the capability of formatting the data set into alternative representations, shown stored at storage locations 16, which may be needed for different transmission methods. The formatting at the server can be implemented as on-demand processing, such that an alternative representation is produced in response to a specific request and then stored for future use, or as anticipatory processing, such that some or all potential alternative representations are created and cached in anticipation of potential requests. Obviously, the latter implementation would require significantly increased use of processing time and storage, all of which may be unnecessary since a request for any one stored alternative representation may never be made.

The server is also equipped with transmitting means 12 which may be a standard network connection, such as software protocol coupled with a network interface card (e.g., Ethernet or a token ring adapter), or a modem connection. The server is additionally provided with component 13 for ascertaining and communicating the server load to a client, as will be further detailed below. Finally, the system is provided with the capability, of monitoring the network bandwidth availability at any given time and testing whether that availability matches that capability which has been assumed for any given transfer method.

Using the server load, network bandwidth, and client-supplied rendering capability information, along with optional user preference data, the optimal transmission method can be chosen, and the requisite representation to be transmitted can be accessed by the server. In one embodiment, the client will generate a request specifying the desired graphics and the chosen transmission method. It is here to be noted that the transmission method choice could be made at the client or the server location; however, it is expected that the client location would be better suited for making the determination, particularly in the instance when the graphics scene to be rendered is comprised of objects downloaded from other servers. Server processor 17 coordinates the I/O, transmission, formatting, load determination and, if this function is supported, the exact parts of the model/representation to be transferred.

At the client location 30, there are provided means for communicating requests, at 32, means for monitoring network bandwidth availability, at 33, display engine 31, and at least one client processor 130. The client location also includes means for receiving user input, at 36, of information relating to user priorities regarding receipt of requested data sets. For example, the user may input, via a keyboard, keypad, voice recognition pick-up, touchscreen, or other equivalent input device, such priority information as (a) the desired level of detail for visual accuracy of the image, which is correlated to the percentage of vertices in the full representation; (b) the desired amount of potential interaction with the representation; and, (c) the rendering speed in, for example, frames per second. The client location also has associated graphics hardware 40 for physically rendering the graphics.

Novel capabilities provided at the client location include performance evaluating and choosing of a preferred transmission method. The means for computing performance of transmission techniques, shown at 34, determines the potential performance of available transmission techniques given user preference information, server load data, network bandwidth availability, network latency, and client rendering capability information. The client location also has components for choosing a transmission technique, based upon the performance evaluation, and for communicating that choice to the server. Once a determination of choice has been made, the communication means, at 32, assembles and transmits a request to the server. As noted above, the capabilities for conducting the performance evaluation and/or choice could, alternatively, be provided at the server in response to a client request which would consist simply of the requested graphics without specifying a transmission method.

The client location is additionally equipped with local memory 38, for storing the data set downloaded from the server, and processor 37, for coordinating the I/O, performance evaluation, request packet assembly, etc. In one alternate embodiment of the invention, yet another novel feature of the client location is the component capability of allowing the user to interact with the performance evaluation information to either choose a transmission method or refine the user preference information to assist the system in automatically choosing a transmission method.

Inventive Framework and Method

In operation, the client initiates the transmission and the rendering process upon input from the user (or input from another application). The client first prepares to evaluate the respective performance functions for each available transmission method by querying the server as to its load, measuring the network bandwidth, and checking the capabilities of the rendering hardware 40, as further detailed below. The capabilities of the rendering hardware are checked only once, upon initialization of the framework, whereas the load query and bandwidth evaluation are dynamic values which may vary during operation and should be updated. Performance functions are computed and, based upon the performance function computations, the client next chooses a transmission technique, essentially by choosing the one with the best overall performance or the one with the best performance given certain pre-defined constraints (e.g., user preferences and/or system constraints). It is at this juncture, in one alternate embodiment, that the user may be asked to choose the transmission method based on performance evaluation results or to input additional preference information for use by the system in recomputing performance evaluation values or in choosing among the previously computed values.

Once a transmission technique has been chosen, the client prepares and sends a request to the server for transmission of the desired data set, or portion thereof, via the chosen transmission method. As an alternative embodiment, either the performance evaluation, the choosing function, or both, may be conducted at the server. Once the transmission method has been chosen, an appropriate representation of the relevant data set is accessed by the server, as further detailed below, and the server commences transmission of data in the appropriate representation. Once data have been sent across the network and received by the client, the client instructs the associated rendering engine to commence operations to display the model.

The illustrated architecture can accommodate different transmission methods. In order to be integrated into the framework, the following components must be available for each transmission method: a component to construct the required representation on the server; a component (i.e., display engine) to display data transmitted using the chosen method at the client; and, a set of performance parameters for characterizing the performance of the method; and means for obtaining those performance parameters (e.g., server load, network bandwidth, etc.)

Figure 2:
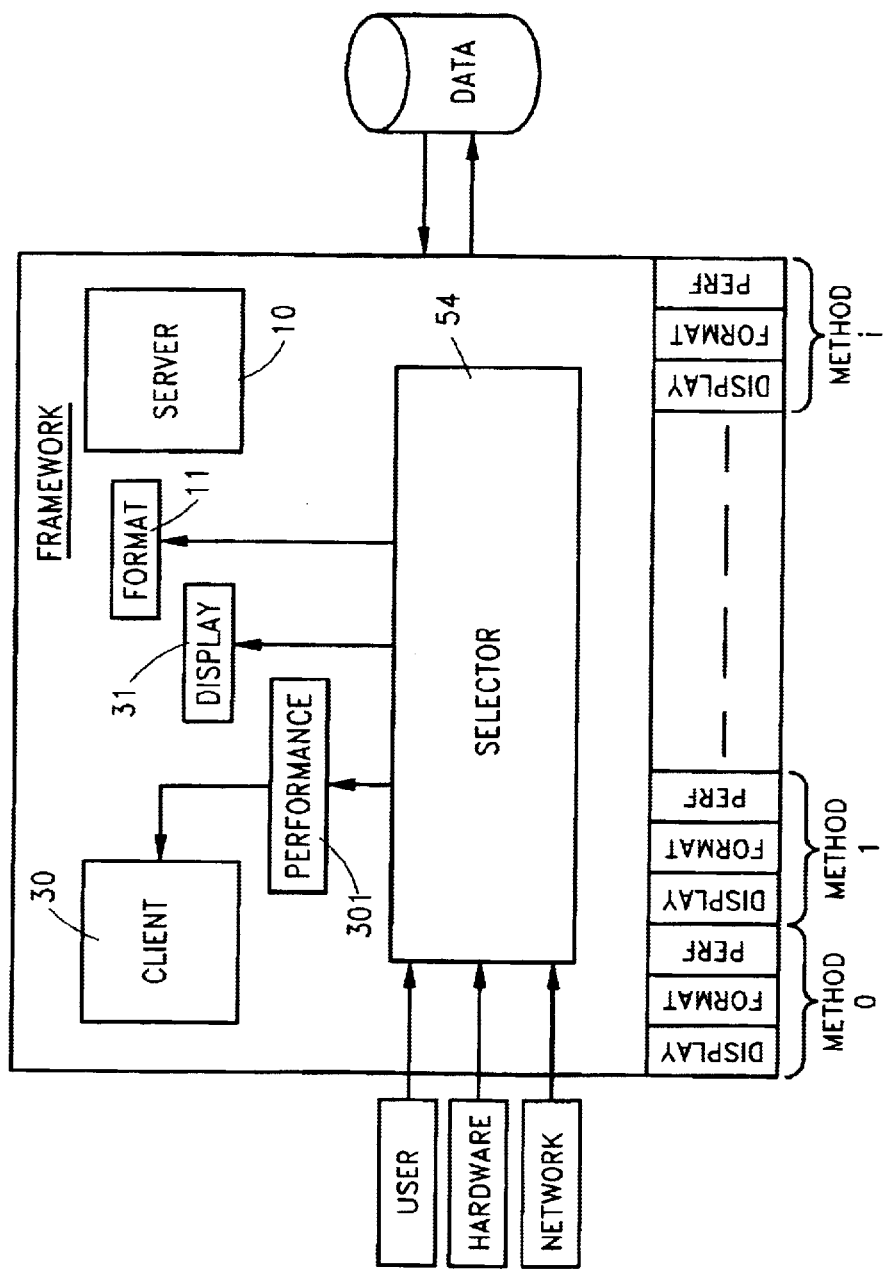
FIG. 2 provides a schematic representation of the framework of the invention.

FIG. 2 illustrate how a common interface for different transmission methods is used to integrate them into the framework. The system looks to a particular transmission method and computes its performance characteristics taking into account input parameters of user preferences, display hardware, and network characteristics. Once the transmission method has been evaluated and selected, the framework activates its associated display engine and format conversion routine. The server converts the data into the appropriate format for the selected transmission method using the format conversion routine and transfers the formatted data. The client then receives and displays the model using the appropriate display engine.

Given the input of the user preferences, hardware characteristics and network characteristics, a performance function is computed for each potential transmission method, representatively shown as being provided to the client along line 301. The performance value, display engine identifier, and formatting routine identifier are available for each method, as illustrated at the bottom of FIG. 2 for methods 0 through i. The choice function 51 triggers the appropriate display engine 31 at the client and formatting routine 11 at the server, based on the resulting choice. Formatted data, whether formatted in response to the request or previously formatted and stored at server storage 15 or 16, is then provided from the server for display at the client.

Figure 3:
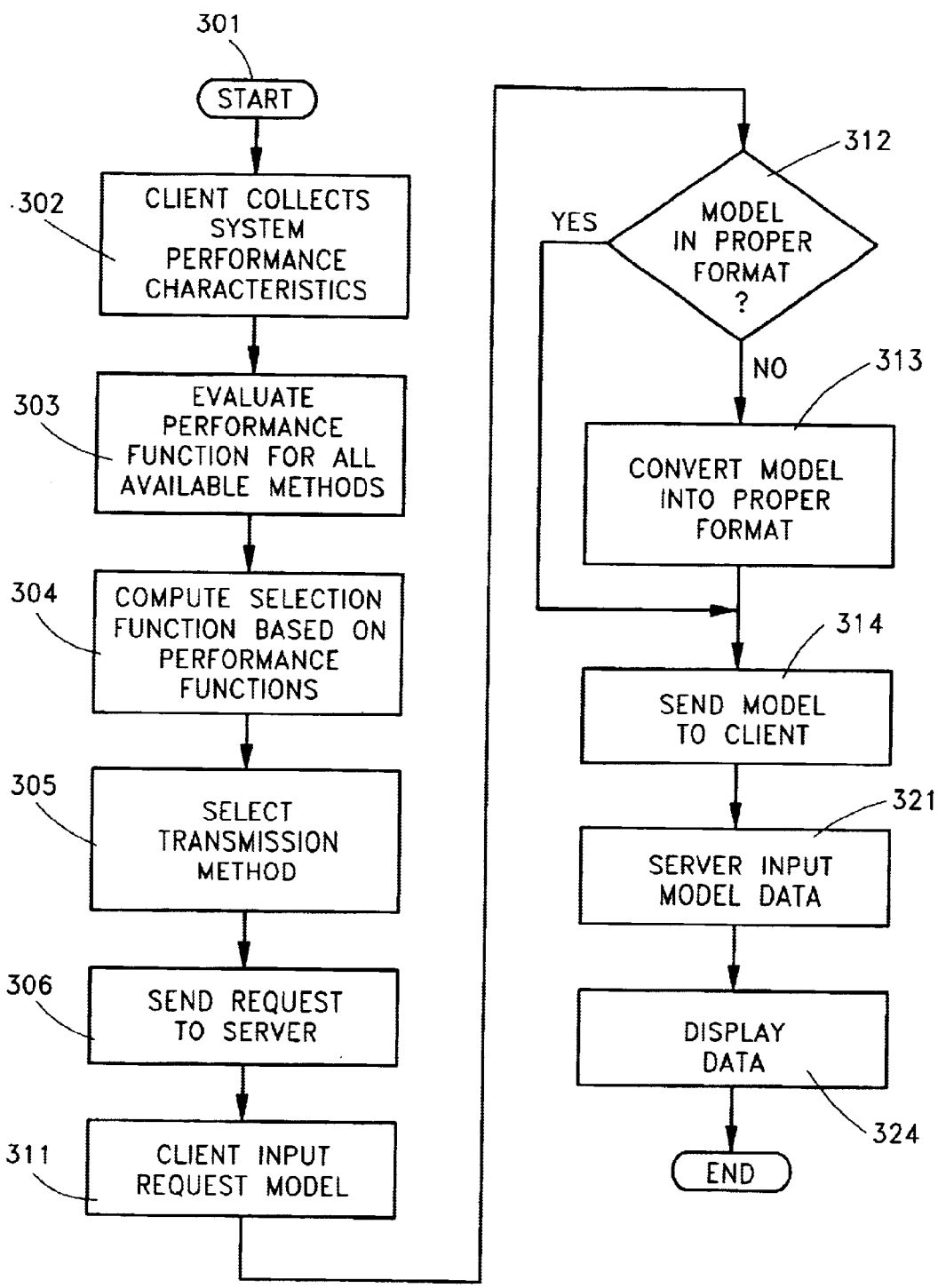
FIG. 3 provides a representative process flow for the request and delivery of three dimensional graphics information in accordance with the present invention.

FIG. 3 provides a representative process flow for one implementation of the present invention. Based upon user input received at step 301, the client collects system performance characteristics at 302 and computes the performance function for all available methods at 303. Based upon the computed performance functions, the client invokes the choice function at 304 and chooses a transmission method at 305. It is to be noted that steps 304 and 305 could be combined in an alternative embodiment, and that any of steps 301–305 could be implemented at either the client or the server location. Once a transmission method has been chosen for the illustrated process implementation, a request is prepared by the client and sent to the server. The request identifies the desired model and the transmission method to be used by the server in communicating the model to the client.

At the server, the client request is received at 311. The server first determines if it has stored the model in the requested format, at decision box 312. If the determination reveals that the model is already available in a format appropriate for transmission via the requested method, then the model is simply retrieved from storage and sent to the client at 314. If, however, the server has not previously stored the appropriately formatted version of the model, it must convert the model into the proper format at 313 and then proceed to step 314 at which point the model is sent to the client. Once the client has received the model from the server at 321, the appropriate display engine is invoked at step 323 and the data displayed at step 324.

Performance Function

The details of the performance function will now be discussed. As previously stated, in order to compute the performance function, the computing entity should obtain user preference input, and hardware and network characteristic information. User preference input may include the aforementioned image quality, rendering speed and degrees of interaction. Hardware capabilities are ascertained at the initialization of the framework and referred to whenever necessary. Network bandwidth can be determined by a variety of methods known in the relevant art, for example by measuring the round-trip time of data packets of varying size. The client may assemble and send data packets of varying size to the server, requesting that the server return the exact packets to the client. The client would then monitor the time taken to receive the returned packets and use that information to estimate the network latency and available bandwidth. By ascertaining the available network bandwidth, the client then determines the time required to transfer the model using a particular transmission method, wherein $T_i$ represents the transmission time for the entire data set using transmission method i and $t_i$ represents the transmission time for the first manipulable partial data set using transmission method i.

To further distinguish between different transmission methods, the invention also defines a metric for quantifying the model quality provided by a particular transmission method. Quality will be measured as a number between, for example, 0.0 and 0.1, taking into account levels of freedom of interaction, rendering speed, and subjective image quality as follows: $Q_i$ represents the quality of the entire model received using transmission method i and $q_i$ represents the quality of the first manipulable unit of the data set using transmission method i.

Determining the server load provides a measurement of the time that it will take for the server to prepare the model for a particular transmission method, wherein $L_i$ represents the time to prepare the data set for transmission method i and $l_i$ represents the time needed to prepare a first manipulable unit of the data set for transmission method i. Note that repeated invocations of a particular transmission method may reduce the server load to 0, thereby amortizing the data formatting cost over several transmissions.

The client capabilities are evaluated to determine how efficiently the client can display data received via a particular transmission method. In representing client capabilities, $C_i$ is the time needed for the client to display the entire model received using transmission method i and $c_i$ is the time needed for the client to display the first manipulable unit of the data set received using transmission method i. It is to be noted that a transmission method may transfer the first manipulable data set unit or any subsequent data set unit in different formats (e.g., first an image and then geometry).

The choice function takes into account all components of the performance model (i.e., available network bandwidth, quality, server load and client capabilities) to choose the transmission method. Depending upon the user-specified preferences, different importance may be given to quality, delay to first manipulable image, and delay to full detail image. The following function describes the generic performance function P for transmission method i:

$$P_i = f(T_i, t_i, Q_i, q_i, L_i, l_i, C_i, c_i)$$

An example of a particular performance function is shown below using a reference model (index 0) to normalize the delays introduced by various components of the system.

$$P_i = q_i/(t_i + l_i + c_i)/(t_o + l_o + c_o) + Q_i/(T_i + L_i + C_i)/(T_o + L_o + C_o).$$

The function S chooses amongst the transmission methods according to the respective performance and possibly according to additional constraints (e.g., the relative value of $T_i$, $Q_i$, or $q_i$):

$$S_i = \max(P_i) \text{ for all i with } T_i < 1.2 \, T_o.$$

Sample Implementations

To further demonstrate the process of providing three dimensional renderings over networks, several transmission methods are discussed along with how they can be integrated into the constant quality of service framework of the present invention.

Reference Method

As a reference method, transmission of a standard data structure for representing three dimensional models is representatively detailed. The model is described by a list of vertices, each of which is represented by v floating point numbers giving, for instance, Cartesian coordinates of the vertex, its color and its normal vector. V shall be the number of vertices in the model. M meshes, each of which contains a list of vertex indices, represent the topology of the model. Each index is represented by an integer. A given mesh m has i vertex indices. It is assumed that integer and floating point numbers are both represented with one word. The transmission of a three dimensional model using this representation will therefore require the following number of words (where BW is the available network bandwidth):

$$T_o = \left[V \cdot v + \sum_{m=0}^{M} i\right] / BW.$$

Since all data must be transmitted before the client can start displaying the model, $t_o=T_o$. In addition, since the server does not need to perform any reformatting of data, $L_o=l_o=0$. Also, since the first display will already be the full-detail model, $Q_o=q_o=1$. Finally, the client's rendering performance will be roughly proportional to the number of vertices in the model:$C_o=c_o=k_owhV$, where $k_o$ is a cost factor for the rendering of meshes into an output image of the size w by h.

Progressive Meshes

Three dimensional data can be transmitted incrementally by first transmitting a coarse mesh that provides an approximation of the model data and then transmitting delta information that refines the mesh locally to increase the fidelity of the representation. After the delta information has been transmitted, the local model is identical to the full-detail model.

A technique for constructing and transmitting progressive meshes is known, as detailed in "Progressive Meshes" by Hughes Hoppe, published at pages 99–108 in the "Proceedings Siggraph" (August 1996). The initial coarse mesh contains a percentage a of the vertices in the full model. The reference method is used to transmit this subset of all vertices. (For simplicity, it is assumed that the initial model will have a percentage α of the meshes in the full model.) The delta records contain one vertex, with v words, and some topological information to specify where the new vertex has to be inserted into the existing mesh, represented with s words. The client displays the image in a window with w by h pixels. With these assumptions, the performance parameters for the progressive mesh method are computed as follows:

$$t = \left[\alpha V \cdot v + \sum_{m=0}^{\alpha M} i\right] / BW$$

$$T = t + \left[(1-\alpha)V \cdot v + \sum_{m=\alpha M}^{M} s\right] / BW$$

$$l = L = k_1 V^2$$

$$c = k_o \alpha V w h$$

$$C = k_o V w h$$

$$q = \alpha$$

$$Q = 1$$

The constant $k_t$ is a cost factor for the construction of the progressive mesh. Without loss of generality, it is assumed that the cost of constructing the progressive meshes is proportional to the square of the number of vertices in the model. Other algorithms with different complexity are conceivable; as described in the aforementioned article. Furthermore, it is assumed that the quality of a rendering of a progressive mesh is directly proportional to the ratio α of displayed vertices to total number of vertices. Other quality measures and relationships could similarly be applied.

Panoramic Rendering

Panoramic rendering is part of a larger class of algorithms known as image-based rendering (IBR). IBR algorithms combine images (two dimensional bitmaps) and three dimensional objects to create views of a three dimensional scene. Panoramic rendering, such as is described by Shen-chang Eric Chen in "QuickTime VR-An Image-Based Approach to Virtual Environment Navigation" from pages 29–38 of "Proceedings Siggraph" (August 1995), generates a 360° surround image (i.e., the panorama) for a given viewpoint in the scene. Dewarping the panorama for a given viewing direction generates a particular view from this viewpoint. Rotation about this viewpoint can be accomplished by panning a sliding window across the panorama. Several panoramas positioned at different locations in the scene enable navigation through a scene using panoramic rendering. Transition between the different panoramas is accomplished using hotlinks embedded in the panorama, as described in "Extending VRML to Support Panoramic Images" by Bengt-Olaf Schneider et al, http://www.austin.ibm.com/vrml/svrml/svrml.html (1997). By storing depth information in the panorama together with the color information, three dimensional objects can be overlaid/inserted into the panorama.

To transmit a three dimensional scene, a panoramic image (of two dimensions) is first transmitted, followed by progressive replacement of parts of the panorama with three dimensional geometry. The panorama is described by W by H pixels, each having n bytes to represent color and depth. Downloading the actual three dimensional geometry is done using the reference method. With these assumptions, the performance parameters for transmission using panoramic rendering is computer as follows:

t=WHn/BW $T=t+T_o$ $l=k_2WHV$

L=0

$c=k_3wh$ $C=k_oVwh$ q=0.5

Q=1

Since interactions with the panorama are restricted to changes of the viewing direction and the field of view (with no translation), q=0.5 can be arbitrarily chosen. The constants $k_2$ and $k_3$ are cost factors for the construction of the panorama on the server and the display of the panorama on the client. These cost factors are dependent upon the capabilities of the client and the server, and reflect, for example, the speed with which pixels can be copied from memory to the screen.

Obviously, the framework described above can accept transmission methods other than the ones described in the foregoing sections, with the only requirement being that the performance parameters for each other method be known in order to compute the performance for choosing the best transmission method.

The invention has been described with reference to several specific embodiments. One having skill in the relevant art will recognize that modifications may be made without departing from the spirit and scope of the invention as set forth in the claims.

Having thus described our invention, what we claim as new and desire to secure by Letters Patent is:

1. A method for evaluating the performance of at least one of a plurality of different methods for transmitting graphics information for supplying three dimensional graphics, comprising time variant and spatially variant data streams in at least one of a plurality of modalities, from a server to a client comprising the steps of:

estimating the elapsed time for each of a plurality of different transmission methods for each of said modalities from said request to rendering of said graphics at the client based on a performance function utilizing a set of performance parameters for characterizing the performance comprising transmitting and receiving the graphics information in time variant and spatially variant data streams and rendering of the graphics at the client; and selecting one of said different transmission methods for one of said modalities based on said estimating.

2. The method of claim 1 wherein said estimating of elapsed time for each transmission method comprises the steps of:

ascertaining the load at said server;

determining network performance;

evaluating client rendering capabilities; and applying a function for estimating said time based on said load, said network performance and said capabilities.

3. The method of claim 2 wherein said evaluating further comprises the steps of:

receiving user preference input at said client;

assigning at least one user preference value; and factoring said at least one user preference value into said function.

4. A method for providing for transmission of a representation of three dimensional computer graphics information from a server location along a network to a client location in response to a client request comprising the steps of:

evaluating the performance of at least one of a plurality of different transmission methods for transmitting graphics information to supply three dimensional graphics, comprising time variant and spatially variant data streams in at least one of a plurality of modalities, from a server to a client from said request to rendering of said graphics at the client based on a performance function utilizing a set of performance parameters for characterizing the performance comprising transmitting and receiving the graphics information in time variant and spatially variant data streams and rendering of the graphics at the client; and choosing one of said plurality of different transmission methods for one of said modalities based upon said evaluating; and transmitting said graphics information by the chosen one of said plurality of transmission methods.

5. The method of claim 4 wherein said evaluating comprises establishing performance values utilizing criteria selected from the group consisting of available network bandwidth, server load, user preferences, client rendering capabilities and combinations thereof.

6. The method of claim 4 wherein said evaluating comprises estimating the elapsed time for each transmission method from said request to rendering of said graphics at the client.

7. The method of claim 6 wherein said estimating of elapsed time for each transmission method comprises the steps of:

ascertaining the load at said server;

determining network performance;

evaluating client rendering capabilities; and applying a function for estimating said time based on said load, said network performance and said capabilities.

8. The method of claim 7 wherein said evaluating further comprises the steps of:

receiving user preference input at said client;

assigning at least one user preference value; and factoring said at least one user preference value into said function.

9. The method of claim 4 wherein said evaluating further comprises the steps of:

receiving user preference input at said client;

assigning at least one user preference value; and factoring said at least one user preference value into said function.

10. The method of claim 4 wherein said evaluating and said choosing are conducted at said client location.

11. The method of claim 10 further comprising the step of said client communicating a request to said server, said request comprising said chosen transmission method.

12. The method of claim 11 wherein said transmitting said graphics information by the chosen one of said plurality of transmission methods comprises the steps at said server of:

receiving said request from said client;

preparing said graphics information for transmission by said chosen transmission method; and transmitting said prepared graphics information.

13. The method of claim 12 wherein said preparing comprises the steps of:

determining what representation of said graphics information is required for said chosen transmission method; and accessing said required representation for transmission.

14. The method of claim 13 wherein said server has at least one storage location and wherein said accessing comprises:

ascertaining whether said representation at said storage location is said required representation; and retrieving said representation from storage.

15. The method of claim 14 further comprising the step of:

formatting said retrieved representation into said required representation if not in said required representation.

16. A system for providing graphics information for supplying three dimensional computer graphics, comprising time variant and spatially variant data streams in at least one of a plurality of modalities, from a server computer location for display at a client computer location comprising:

a performance evaluator for assigning a plurality of performance values to each of a plurality of different transmission methods for each of said modalities based on a performance function for performance comprising transmitting and receiving said graphics information in time variant and spatially variant data streams in at least one of said plurality of modalities and rendering of the graphics at the client;

a selector for choosing one of said plurality of transmission methods and modalities based upon said performance values; and transmitter means for transmitting said graphics information in time variant and spatially variant data streams by the chosen one of said plurality of transmission methods and modalities.

17. The system of claim 16 wherein said performance evaluator establishes performance values utilizing criteria selected from the group consisting of available network bandwidth, server load, user preferences, client rendering capabilities and combinations thereof.

18. The system of claim 16 wherein said performance evaluator includes means for estimating the elapsed time for each transmission method from said request to rendering of said graphics at the client.

19. The system of claim 18 wherein said means for estimating elapsed time for each transmission method comprises:

a server load evaluator;

at least one component for determining network performance;

means for reporting the client rendering capability; and an estimator component for applying a function to estimate said time based on said load, said network performance and said capability.

20. The system of claim 19 further comprising:

user preference input component at said client;

user preference value assignment component; and wherein said performance evaluator includes means for factoring said at least one user preference value into said function.

21. The system of claim 16 wherein said performance evaluator and said selector are located at said client computer location.

22. The system of claim 21 further comprising client communication component for assembling and communicating a request to said server, said request comprising said chosen transmission method.

23. The system of claim 21 wherein said server comprises:

a receiver for receiving said request from said client;

means for preparing said graphics information for transmission by said chosen transmission method; and said transmitter means.

24. The system of claim 23 wherein said means for preparing comprises:

a lookup component for determining what representation of said graphics information is required for said chosen transmission method; and means for accessing said required representation for transmission.

25. The system of claim 24 wherein said server further comprises at least one storage location and wherein said means for accessing comprises:

comparator means for ascertaining whether said representation at said storage location is said required representation; and retrieval means for retrieving said representation from storage.

26. The system of claim 25 wherein said server further comprises:

translator means for formatting said retrieved representation into said required representation if not in said required representation.

* * * * *